March 16, 1954 W. HOLIN 2,672,381
JOURNAL BOX END THRUST CONSTRUCTION
Filed July 8, 1950
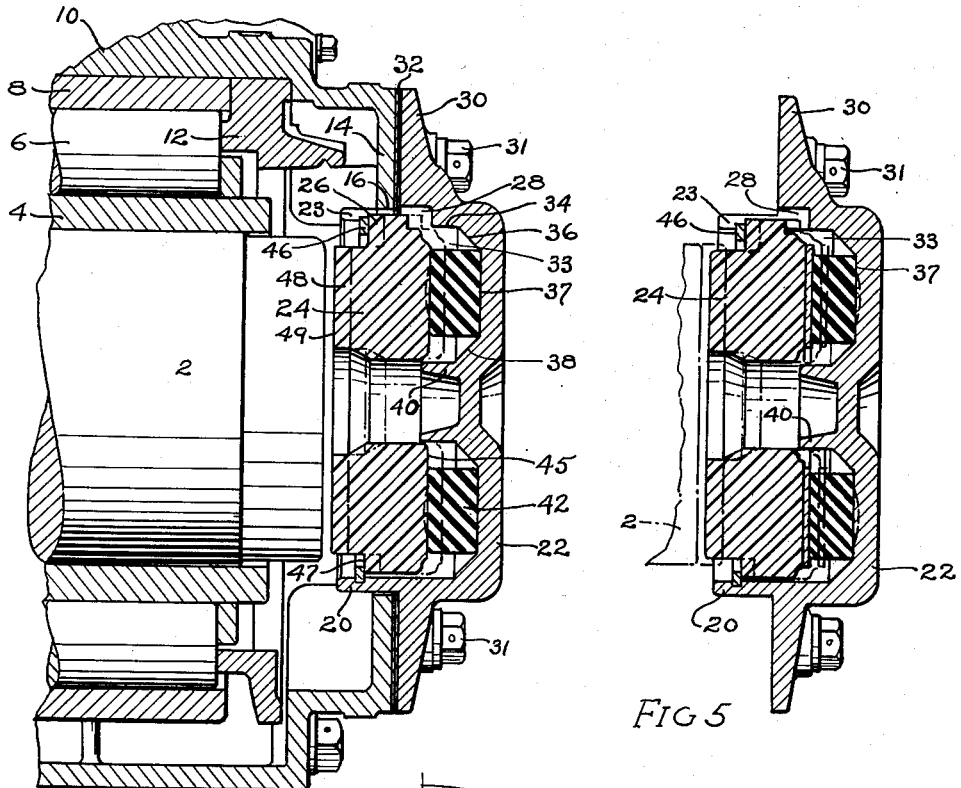
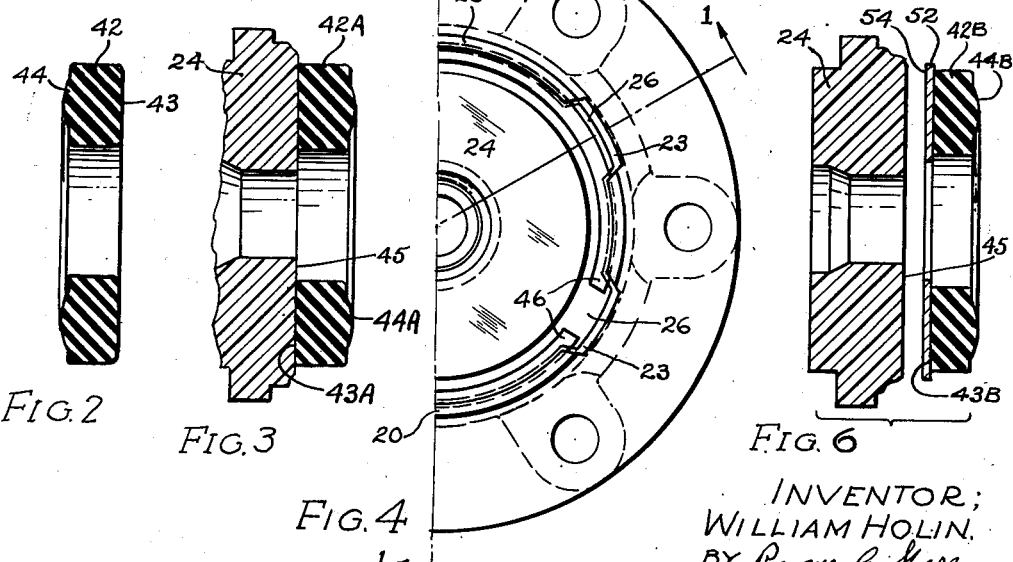
INVENTOR;
WILLIAM HOLIN,
BY Romeyn G. Spare
HIS ATTORNEY.

Patented Mar. 16, 1954

2,672,381

UNITED STATES PATENT OFFICE 2,672,381

JOURNAL BOX END THRUST CONSTRUCTION

William Holin, Riverside, Ill., assignor to General Motors Corporation, Detroit, Mich., a corporation of Delaware Application July 8, 1950, Serial No. 172,769

8 Claims. (Cl. 308—41)

This invention relates to railroad journal boxes and particularly to an end thrust arrangement for use in a journal box.

An object of the invention is to provide an improved thrust construction for journal boxes and especially an antifriction thrust arrangement which can be installed in an end cap of the journal box.

A further object is to provide an improved adjustable cushioned thrust arrangement for journal boxes and which can be assembled under a preload in the end cap of the journal box.

To these ends and also to improve generally upon devices of this character, my invention consists in the various matters hereinafter described and claimed. In its broader aspects, the invention is not necessarily limited to the specific structures selected for illustrative purposes in the accompanying drawings wherein Figure 1 is a longitudinal section at the outer or front end of a journal box and taken along the lines 1—1 of Figure 4;

Figure 2 is a cross section through one form of my annular cushion member;

Figure 3 is a fragmentary section showing one form of my cushion and thrust block assembly;

Figure 4 is a fragmentary end view of the end cap and thrust block;

Figure 5 is a sectional view taken similar to the section of Figure 1 and showing another form of my thrust block and cushion assembled in the end cap; and Figure 6 is a sectional view showing the thrust block and cushion member used in Figure 5.

The end portion of an axle 2 is provided with a pressed-on inner raceway sleeve 4 journalled for rotation in roller bearings 6 arranged to roll against an outer raceway sleeve 8 mounted in a journal box 10. The journal box construction may have various forms but is preferably similar to that illustrated in the United States Patent No. 2,433,022 to Brittain and includes a ring 12 which collects lubricant from the bearings and delivers it to a thrust unit. The outer end of the journal box has a radially inwardly projecting end flange 14 defining a round opening 16 which receives an interrupted cylindrical flange 20 axially projecting from an end cap 22, the flange 20 being interrupted by gaps or slots 23. A thrust block 24 loosely fits within the flange 20 with some clearance and has a series of outwardly projecting lugs 26 loosely entering the slots 23 to hold the thrust block from rotation.

A portion of each lug 26 extends into a recess 28 in the end cap 22. The end cap 22 has an outwardly extending flange 30 which is secured as by bolts or cap screws 31 to the journal box, suitable shims 32 being imposed between the flange 30 and the flange 14. The end cap has a circular recess 33 defined in part by a cylindrical wall 34 which is a continuation of the bore of the flange 20, the wall 34 meeting a short conical wall 36 which in turn meets a flat bottom wall 37. This flat bottom wall also meets a short conical wall 38 that joins an annular projection 40 extending from the center of the end cap and loosely fitting part way into a central bore through the thrust block 24.

An annular pad or cushion 42, composed of an inherently resilient material as synthetic rubber or the like, is centered by the conical faces 36 and 38 and has a substantially rectangular cross section when mounted under a normal preload. When uncompressed, as shown in Figure 2, this resilient cushion 42 has a flat end face 43 and a convexed end face 44 forming an annularly extending bulge. As illustrated in Figure 1, this cushion 42 under preload has its convexed face 44 deformed flat against a flat end face 45 of the thrust block 24. The thrust block 24 is held against the cushion 42 by a split ring 46 demountably sprung into an annular groove in the flange 20, this ring engaging a thrust block shoulder 47 and surrounding a thrust block projection 48 whose flat end face 49 is intermittently engaged by the axle 2 when it shifts endwise in its bearings. To facilitate removal, the ends of the split ring 46 are preferably located in one of the slots 23 in the flange 20. Under a heavy thrust load, the thrust block 24 will shift deeper into the recess 33 in the end cap further compressing the resilient cushion 42; and if this thrust load is sufficiently heavy, the resilient cushion will deform and fill the decreasing space and finally go solid before the lugs 26 bottom in the recesses 28.

The thrust block 24 is non-metallic and preferably made from a resinous wear-resistant material which has a very low coefficient of friction against steel in the presence of lubricant; one satisfactory material being known as "Gatke" and composed of graphite-coated fibers or of graphite-coated fabric layers which are impregnated with a phenolformaldehyde resin that is heat-set in a suitable mold. This material attracts oil which adheres to it tenaciously and provides adequate lubrication which is especially important for this type of construction wherein the thrust face operates in a vertical plane. This "Gatke" material will not score the axle. Thrust blocks of bronze and other material as previously used may cause scoring and require the facing off of the end of the axle which then has the further disadvantage of requiring adjustment of the spacing between the axle and the thrust block. By employing this non-axle scoring block, it is unnecessary to provide any adjusting mechanism for taking up wear at more or less frequent intervals. The clearance between the "Gatke" thrust block and the axle can be initially set larger than the normal clearance to give the apparatus opportunity to run in after which one or more of the shims 32 can be removed to reduce the running clearance to normal.

Figure 3 shows a slightly different embodiment wherein a resilient cushion 42A, similar to the cushion 42, has its flat end face 43A secured as by rubber cement or other suitable cement to the flat face 45 of the thrust block 24. This thrust block and cushion arrangement replaces the thrust block and cushion of Figure 1, and the convexed cushion face 44A deforms to flat seating engagement against the end cap face 37 under normal preload.

Figures 5 and 6 show another embodiment wherein a resilient cushion 42B, generally similar to the cushion 42, has its flat end face 43B secured as by rubber cement or other suitable cement to a flat washer 52 of metal, fiber plastic or other suitable rigid material. The inner diameter of this washer preferably is less than that of the annular cushion 42B and the outer washer diameter preferably exceeds that of this annular cushion to provide better support for the cushion under load. When assembled under preload, a flat face 54 of the washer 52 engages the flat face 45 of the thrust block 24 and the convexed face 44B of the cushion is deformed into flat seating engagement with the end cap face 37. The thrust block and the cushion 42B are held under preload by the split ring 46 in the same manner as previously described.

In each embodiment, the end cap, thrust block, annular cushion and split ring provide a preloaded cushioning unit composed of few parts. Under heavy load, the cushion will resiliently deform and finally completely fill the decreasing recess 33 in the end cap thereby limiting the extent of end thrust of the axle. This unit-handling end cap assembly can be readily bolted to or axially removed from the box without affecting the preload and this preload will have no effect on the bolting operation.

I claim:

1. A preloaded thrust unit for journal boxes comprising an end cap having an annular recess and an inwardly axially projecting annular flange, said flange being provided at its inner end with a gap, a thrust block entering within the projecting flange and having a lug entering said gap, a compressed resilient annular cushion within and coaxially of said recess between the thrust block and the end cap, and a split ring demountably secured to said projecting flange and engaging the thrust block to hold the cushion under compression.

2. A preloaded thrust unit for journal boxes comprising an end cap having an annular recess surrounding a central projection, an annular cushion in the recess and surrounding said projection, a one piece thrust block of wear-resistant resinous material carried by the end cap and slidably fitted over the central end cap projection, the cushion being compressed between the thrust block and said end cap, and a demountable snap ring carried by the end cap and engaging the thrust block to hold all of said parts together as a unit.

3. In a device of the character indicated, an axle, a journal box, an end cap secured to the journal box and having an internal annular recess surrounding a central end cap projection, a thrust block in the end cap and surrounding the end cap projection, an annular cushion mounted in the recess in surrounding relation to said end cap projection and compressed between the thrust block and the end cap, the thrust block having a thrust face engageable with and normally spaced from the end of the axle, means mounted on the end cap to adjust the spacing between the thrust block and the axle, and a member demountably secured to the end cap and holding the thrust block, cushion and end cap together as a unit with said cushion under predetermined initial compression.

4. A preloaded thrust unit for journal boxes comprising an end cap containing an annular recess, an end cap projection within and substantially central of said recess, an annular thrust block of molded resinous material mounted for axial movement in said recess, a resilient annular cushion extending between the thrust block and the end cap, end cap means positioning the cushion in radially spaced relation to the peripheral wall of the recess and to said end cap projection, said cushion being resiliently deformable in all directions, and a ring demountably received in the end cap and engaging the thrust block to maintain the cushion under a predetermined initial compression.

5. A preloaded thrust unit for journal boxes comprising an end cap having an annular recess surrounding an axial projection, an annular thrust block surrounding the axial projection, a resiliently deformable annular cushion in said recess and substantially coaxial of the thrust block, said cushion being compressed between the thrust block and the end cap and having opposed faces one of which has an annularly extending bulge when the cushion is uncompressed, and a member demountably securing the thrust block within the end cap with the cushion compressed a predetermined extent therebetween.

6. A preloaded journal box thrust construction comprising an end cap having an annularly extending flange projecting axially into the journal box, said flange being interrupted at its end by circumferentially spaced openings, the thrust block slidably fitting within the projecting flange and having circumferentially spaced radially extending lugs respectively entering said openings, a resilient annular cushion compressed between the thrust block and the end cap, said flange having a radially inwardly extending groove adjacent the open end of the flange, a split ring projecting radially inwardly from the groove and engaging the thrust block to demountably hold the thrust block within said flange and hold the resilient cushion under axial compression, and the ends of the split ring terminating in one of said openings.

7. In a device of the character indicated, an end cap demountably secured to and closing the open end of a journal box, the end cap having an annular recess, an annular cushion within the recess, the cushion being resiliently deformable in all directions, an end cap portion locating the cushion substantially coaxial of the recess and radially spaced from the peripheral wall of said recess, a thrust block supported by the end cap for axially slidable movement in said recess, the thrust block being integrally secured to the cushion, and a thrust block engaging member demountably secured to the end cap and locating the thrust block against the resilient cushion to maintain the cushion under a predetermined initial compression.

8. A preloaded thrust unit for a journal box comprising an end cap having an annular recess, an annular cushion of resilient material in the recess, a washer secured to and in unit handling relation with the cushion, an axially extending end cap projection surrounded by said recess, an annular thrust block slidably mounted for movement in the end cap and guided in its movement by said projection, the thrust block being engageable with said washer under pressure to compress the cushion, and a thrust block engaging member demountably secured to the end cap and demountably maintaining the thrust block under an initial predetermined pressure against the washer.

WILLIAM HOLIN.

References Cited in the file of this patent

UNITED STATES PATENTS

| Number | Name | Date |
| --- | --- | --- |
| 402,987 | Sharpneck | May 7, 1889 |
| 2,141,122 | Boden | Dec. 20, 1938 |
| 2,251,126 | Gatke | July 29, 1941 |
| 2,273,308 | Young | Feb. 17, 1942 |
| 2,317,920 | Landt | Apr. 27, 1943 |
| 2,533,917 | Buckius | Dec. 12, 1950 |

FOREIGN PATENTS

| Number | Country | Date |
| --- | --- | --- |
| 839,034 | France | Mar. 22, 1939 |